(12) United States Patent
Trudeau et al.

(10) Patent No.: US 12,325,212 B2
(45) Date of Patent: Jun. 10, 2025

(54) WINDOW ASSEMBLIES

(71) Applicant: TruArmor a division of Clear-Armor LLC, Grayslake, IL (US)

(72) Inventors: David Anthony Trudeau, Grayslake, IL (US); Alex Trudeau, Grayslake, IL (US)

(73) Assignee: TruArmor a division of Clear-Armor, LLC, Grayslake, IL (US)

( * ) Notice: Subject to any disclaimer, the term of this patent is extended or adjusted under 35 U.S.C. 154(b) by 778 days.

(21) Appl. No.: 17/360,248

(22) Filed: Jun. 28, 2021

(65) Prior Publication Data

US 2022/0410541 A1 Dec. 29, 2022

(51) Int. Cl.
| | | |
|---|---|---|
| *B32B 17/10* | (2006.01) | |
| *B32B 27/36* | (2006.01) | |
| *B60J 1/00* | (2006.01) | |
| *B60J 1/02* | (2006.01) | |

(52) U.S. Cl.
CPC .. *B32B 17/10761* (2013.01); *B32B 17/10036* (2013.01); *B32B 27/36* (2013.01); *B60J 1/001* (2013.01); *B60J 1/02* (2013.01); *B32B 2367/00* (2013.01)

(58) Field of Classification Search
None
See application file for complete search history.

(56) References Cited

U.S. PATENT DOCUMENTS

| | | | |
|---|---|---|---|
| 3,930,452 A | 1/1976 | Van Laethem et al. | |
| 4,055,031 A | 10/1977 | Okawa et al. | |
| 4,336,644 A | 1/1982 | Medlin | |
| 4,331,359 A | 5/1982 | Sheldon | |
| 4,952,459 A | 8/1990 | Thatcher | |
| 5,271,311 A | 12/1993 | Madden | |
| 5,368,904 A | 11/1994 | Stephinson | |
| 5,567,529 A | 10/1996 | Smith | |
| 5,594,193 A | 1/1997 | Sheridan | |
| 5,747,159 A | 5/1998 | Labock | |
| 5,789,327 A | 8/1998 | Rousseau | |
| 5,811,719 A | 9/1998 | Madden, Jr. | |

(Continued)

FOREIGN PATENT DOCUMENTS

| | | |
|---|---|---|
| CN | 2247098 | 2/1997 |
| DE | 10002449 | 8/2001 |

(Continued)

OTHER PUBLICATIONS

Autoglaze, "Ever Wondered What The Little Dots Around A Windscreen Are for?" Apr. 2008. (Year: 2008).*

(Continued)

*Primary Examiner* — David Sample
(74) *Attorney, Agent, or Firm* — Boyle Fredrickson, S.C.; Kirk L. Deheck (57) ABSTRACT

A window assembly and method of forming a window assembly that is constructed to maintain separation of the environments separated by the window assembly when the window assembly is subjected to impacts and cooperate with the structure of associated with defining the window opening without detracting the operability of the window assembly relative to openings defined by the structure of third party original equipment manufacturers structures.

20 Claims, 3 Drawing Sheets

(56) References Cited

U.S. PATENT DOCUMENTS

| | | |
|---|---|---|
| 5,857,730 A | 1/1999 | Korapi et al. |
| 5,908,674 A | 1/1999 | Schindler et al. |
| 6,027,158 A | 2/2000 | Yang |
| 6,280,826 B1 | 8/2001 | Woll et al. |
| 6,327,954 B1 | 12/2001 | Medlin |
| 6,333,085 B1 | 12/2001 | Emek |
| 6,509,071 B1 | 1/2003 | Emek |
| 6,546,692 B1 | 4/2003 | Duncan et al. |
| 6,818,268 B2 | 11/2004 | Gonzalez |
| 7,063,374 B1 | 6/2006 | Cameron |
| 7,114,760 B2 | 10/2006 | Cameron |
| 7,232,181 B2 | 6/2007 | Schmucker |
| 7,318,956 B2 | 1/2008 | Labock |
| 7,854,466 B2 | 12/2010 | Blackmer et al. |
| 8,088,462 B1 | 1/2012 | Cockman et al. |
| 8,197,928 B2 | 6/2012 | Volpp et al. |
| 8,281,550 B1 | 10/2012 | Bolton et al. |
| 8,863,440 B1 | 10/2014 | Champlin |
| 9,091,510 B2 | 7/2015 | Carberry et al. |
| 9,500,445 B2 | 11/2016 | Hsieh et al. |
| 9,651,340 B1 | 5/2017 | Tunis, III et al. |
| 9,982,969 B2 | 5/2018 | Klingman et al. |
| 10,006,744 B2 | 6/2018 | Wibby |
| 10,352,660 B2 | 7/2019 | Trott |
| 2008/0063819 A1 | 3/2008 | Monroe et al. |
| 2008/0129084 A1 | 6/2008 | Blackmer et al. |
| 2009/0139091 A1 | 6/2009 | Tucker et al. |
| 2009/0263651 A1 | 10/2009 | Cook |
| 2011/0072961 A1 | 3/2011 | Jungkuist et al. |
| 2011/0308381 A1 | 12/2011 | Hartley |
| 2012/0180638 A1 | 7/2012 | Hubert |
| 2012/0207966 A1 | 8/2012 | Dickson |
| 2013/0171398 A1 | 7/2013 | Stranner |
| 2014/0260937 A1 | 9/2014 | Whitaker |
| 2014/0326126 A1 | 11/2014 | Hay, III et al. |
| 2015/0140301 A1 | 5/2015 | Fisher et al. |
| 2015/0260483 A1 | 9/2015 | Wibby et al. |
| 2015/0285595 A1 | 10/2015 | Auchter-Krummel et al. |
| 2016/0187107 A1 | 6/2016 | Johnston et al. |
| 2018/0087877 A1 | 3/2018 | Carton |
| 2018/0229480 A1 | 8/2018 | Chung |

FOREIGN PATENT DOCUMENTS

| | | | |
|---|---|---|---|
| EP | 0827881 A2 * | 3/1998 | |
| EP | 1632342 A1 * | 3/2006 | ............ B29C 59/14 |
| JP | 2003176159 A | 6/2003 | |
| KR | 1020210073783 | 6/2021 | |
| WO | WO-0143963 A1 * | 6/2001 | ............ B32B 17/10 |
| WO | WO-2011023178 A1 * | 3/2011 | ............ B32B 17/10 |

OTHER PUBLICATIONS

"How is shatterproof glass made?" https://onesky.ph/blog/how-shatterproof-glass-made/ Aug. 15, 2020. (Year: 2020).*

PCT Notice and International Search Report and Written Opinion, Dated Oct. 18, 2022, 11 pages.

"OneWay Bullet Resistant Glass", Regev Maimon, www.youtube.com, Jul. 21, 2009 (Year: 2009).

"One-Way Ballistic Glass", Total Security Solutions, www.tssbulletproof.com, Sep. 26, 2011 (Year: 2011).

"Compressive Strength Testing of Plastics"; http://www.matweb.com/reference/compressivestrength.aspx (Year: 2007).

Bos, Freek; Louter, Christian; Veer, Fred; "Challenging Glass: Conference on Architectural and Structural Applications of Glass; Faculty of Architecture, Delft University of Technology"; May 2008'; ISBN 9781586038663, p. 148 (Year: 2008).

* cited by examiner

WINDOW ASSEMBLIES

BACKGROUND OF THE INVENTION

Penetration resistance is a property that is desired in various environments and in various applications. Examples of such applications include providing structures that can withstand storm debris impacts, building and vehicle security windows, etc. Understandably, the degree and nature of the penetration resistance performance is largely related to the use and construction of the underlying structure or vehicle as well as the ability of the structure or vehicle to withstand the weight and forces associated with other considerations related to movability and/or the underlying operation of the structures and/or vehicles with which they are supported and providing a desired degree of penetration resistance.

With respect to storm proofing applications, others provide window and door assemblies that are constructed to provide variable degrees of debris or projectile impact resistance. Unfortunately, such approaches are not without their respective drawbacks. For instance, storm proofing existing structures and/or the glass panel assemblies associated with windows and doors common thereto generally requires replacement of the entire framed and jammed window and door units as a whole. Such an approach requires consideration of building codes and building aesthetics so as to maintain an unobtrusive presentation of the penetration resistant structures. Such an approach substantially increases new building construction, tends to reduce area associated with the see-through structures of the windows and doors, and is generally cost prohibitive from a remodeling perspective.

Further, with respect to configuring existing structures to provide penetration resistance, the existing underlying structures associated with supporting the respective doors and windows are commonly ill-suited to withstand the additional loading associated with replacement of such structures. That is, storm proof windows and doors are generally substantially heavier than traditional window and door frame assemblies such that the underlying building framing must be designed and constructed to support the loading that the transparent structures are intended to withstand. Such considerations are more problematic in multi-floored structures and/or structures having floor-to-ceiling window and/or door panels wherein the underlying structural framing is ill-suited to withstand the addition forces associated with penetration resistant window and door panels and the weight and forces customary thereto. Accordingly, a first aspect of the present invention is directed to providing glass panel structures that exhibit improved penetration resistance or panel failure to existing window and/or door structures and particularly, the transparent portions thereof.

It is appreciated that providing penetration resistance to transparent structures as discussed above has applications beyond building structures. For instance, it should be appreciated that penetration resistance would be advantageous to many vehicle applications. For instance, vehicles can periodically encounter airborne road debris impacted upon the vehicle windows. Although windshields of modern vehicles are constructed in accordance with government standards to withstand failure when subjected to a prescribed impact load—commonly referred to as a drop ball test, wherein a metallic ball of a given mass and accelerated under gravitational forces is impacted upon the windshield, side and rear windows are not commonly constructed to withstand impacts comparable to the windshield integrity. Even satisfying the government standards, reports are frequent if not common of airborne road debris penetrating windshields and periodically injuring vehicle occupants. Although military and various other applications provide vehicle constructions with substantial armaments, the construction of personal vehicles are ill-equipped to support the weight and limited window operability associated with extraneous vehicle window armament systems wherein supplemental transparent structures are secured to the frame of a vehicle so as to generally overlie the OEM windows and vehicle frame openings attenuate thereto.

Still further, personnel vehicles are far more often subjected to vandalism associated with smash-and-grab type burglaries and/or vehicle vandalism. For instance, many consumers are aware that a sharp impact, such as that provided via a centerpunch tool or other emergency auto hammer tools, quickly fracture the side and rear windows of personal vehicles in such a manner that the contents of the vehicle are rendered readily accessible to nefarious actors. Although transparent panels mounted within the cavity of the vehicle renders the opening non-accessible to such actors, as mentioned above, such systems are cost and weight prohibitive for wide acceptance within the personal vehicle markets. Still further, such approaches at improving the vehicle security integrity sacrifices the owner's or operator's ability to have the various operable windows of the vehicle assembly in fully open, fully closed, or variable positions therebetween. Such methodologies negate the ability of the owner's/operators of the vehicle to effectuate many operations that are ubiquitous to modern vehicle operation such as interaction with various drive-through operations or the like common to food, medicinal, and/or banking drive through operations.

Therefore, a need exists for vehicle and building window assemblies wherein the transparent window panels provide improved structural integrity and/or projectile penetration resistance without detrimentally impacting the transparent or translucent nature of the underlying glass assembly, do not detract from or require specialized cleaning operations, and which are constructed to be of a weight and construction for cooperation with customary building and vehicle mounting and operation systems without negating the intended operability of the window when associated with the corresponding original equipment manufacturers (OEM's) building or vehicle structures.

SUMMARY OF THE INVENTION

The present invention relates to transparent window assemblies, implementations, and methods of manufacturing transparent window assemblies that are constructed to cooperate with original OEM building and vehicle mounting structures and which provided better resistant to penetration or full structural failure when subjected to greater impacts than currently available window assemblies and overcomes the drawbacks of previous smash or impact resistant window assemblies.

In accordance with one aspect of the application, an impact resistant window assembly is disclosed that includes a first glass layer and a second glass layer that define opposing lateral sides of the impact resistance window assembly. A first adhesive layer and a second adhesive layer that are each comprised of one of an ethylene vinyl acetate (EVA) adhesive or a polyvinyl butyral (PVB) adhesive and such that the first adhesive layer overlies at least one side of the first glass layer and the second adhesive layer overlies at least one side of second glass layer. A reinforcement layer comprising one of a polyethylene terephthalate (PET) layer or thermoplastic polyester polyethylene terephthalate glycol (PET-G) layer that overlies and is disposed between the first adhesive layer and the second adhesive layer. When assembled, the impact resistant window assembly is shaped and constructed to cooperate with the operational and mounting arrangements defined by original equipment manufacturers building and vehicle openings and to remain intact when subjected to at least a five pound ball drop test from at least 30 feet and has a thickness that allows the impact resistant window assembly to be secured to an opening defined by the original equipment manufacturer (OEM) mounting arrangement.

Another aspect of the present application discloses a window assembly that includes a first glass layer that is disposed on a first side of the window assembly and a second glass layer that is disposed on a second side of the window assembly. A first adhesive layer and a second adhesive layer that are each comprised of one of an ethylene vinyl acetate (EVA) adhesive or a polyvinyl butyral (PVB) adhesive each overlie an assembly inward facing respective side of the first glass layer and the second glass layer. A reinforcement layer that is comprised of one of a polyethylene terephthalate (PET) material or thermoplastic polyester polyethylene terephthalate glycol (PET-G) material overlies and is disposed between the first adhesive layer and the second adhesive layer such that the first and second glass layers are disposed on laterally outward facing sides of the window assembly and the adhesive layers and the reinforcement layer are disposed between the respective first and second glass layers.

A further aspect of the application discloses a method of forming a window assembly that includes acquiring a first pane of glass and a second pane of glass that are the same shape and are each one of a tempered, annealed, or heat strengthened pane of glass. A first adhesive layer formed of one of an ethylene vinyl acetate (EVA) adhesive or a polyvinyl butyral (PVB) adhesive is adhered to a respective side of the first pane of glass. A reinforcement layer formed of one of a polyethylene terephthalate (PET) layer or thermoplastic polyester polyethylene terephthalate glycol (PET-G) layer is adhered to the first adhesive layer so that the reinforcement layer overlies the first adhesive layer. A second adhesive layer that is formed of one of the ethylene vinyl acetate (EVA) adhesive or the polyvinyl butyral (PVB) adhesive is adhered to an exposed surface of the reinforcement layer so that the second adhesive layer overlies the reinforcement layer and an exposed surface of the second adhesive layer can be adhered to the second pane of glass.

These and other aspects, features, and objectives of the present invention will be appreciated and understood from the following brief description of the drawings and the detailed description of that which is shown therein.

BRIEF DESCRIPTION OF THE DRAWINGS

A clear conception of the advantages and features constituting the present invention will become more readily apparent by referring to the exemplary, and therefore non-limiting, embodiments illustrated in the drawings accompanying and forming a part of this specification, wherein like reference numerals designate the same elements in the several views.

In the drawings.

DETAILED DESCRIPTION

The present invention and the various features and advantageous details thereof are explained more fully with reference to the non-limiting embodiments described in detail in the following description.

Figure 1:
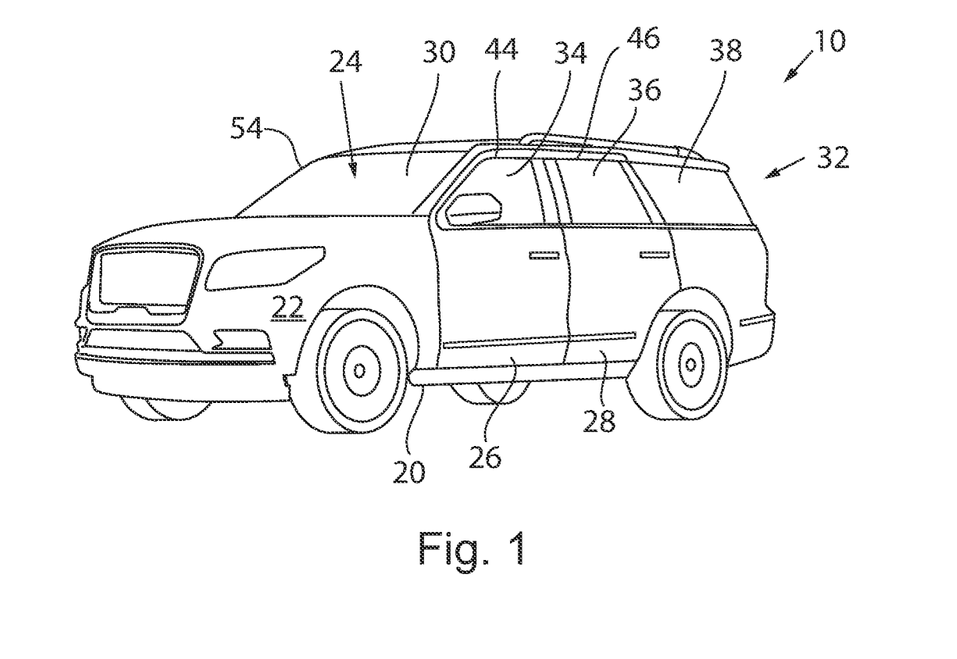
FIG. 1 is a perspective view of an exemplary original equipment manufacturer (OEM) vehicle that is equipped with one or more window assemblies constructed in accordance with the present invention.

FIG. 1 shows an exemplary original equipment manufacturer (OEM) vehicle assembly or vehicle 10 equipped with a plurality of penetration resistance window assemblies according to the present invention. Vehicle 10 is generally defined by a frame 20 and the body 22 that is constructed to enclose cabin 24. One or more doors 26, 28 are associated with the generally opposite lateral sides of vehicle 10 and configured to allow occupants to access cabin 24. One or more window assemblies or windows such as a windshield 30, a rear window 32, one or more operable door windows 34, 36, and cargo bay windows 38 provide the occupants of vehicle 10 with a visual inspection of areas proximate thereto.

As is commonly understood, one or more of door windows 34, 36 cargo window 38 and/or rear window 32, depending on the configuration of vehicle 10, may be provided in an operable form factor when the respective windows can be opened or closed relative to the adjacent opening defined by the structure of vehicle 10 to allow exposure of cabin 24 to the surrounding atmosphere. When provided in an operable configuration, windows, such as door windows 34, 36 are movable between a closed configuration, as shown in FIG. 1, an open configuration wherein the transparent panels defined by windows 34, 36 are received an a cavity between the respective exterior facing door skin and the trim disposed along the interior or cabin facing surfaces of doors 26, 28, and variable positions therebetween. The operable nature of respective windows 34, 36 and/or rear window 32 provide a pass-through for the occupants of vehicle 10 with the surrounding environment and/or accommodate violation of cabin 24 when desired.

Windshield 30, and commonly cargo windows 38 and/or rear window 32, are attached to vehicle 10 so as to be generally inoperable or not movable relative to vehicle 10. As disclosed further below, stationary windows such as windshield 30 cargo window 38 and rear window 32 are commonly provided with a frit material which extends about the circumference of the discrete window and which is secured to the underlying vehicle 10.

Figure 2:
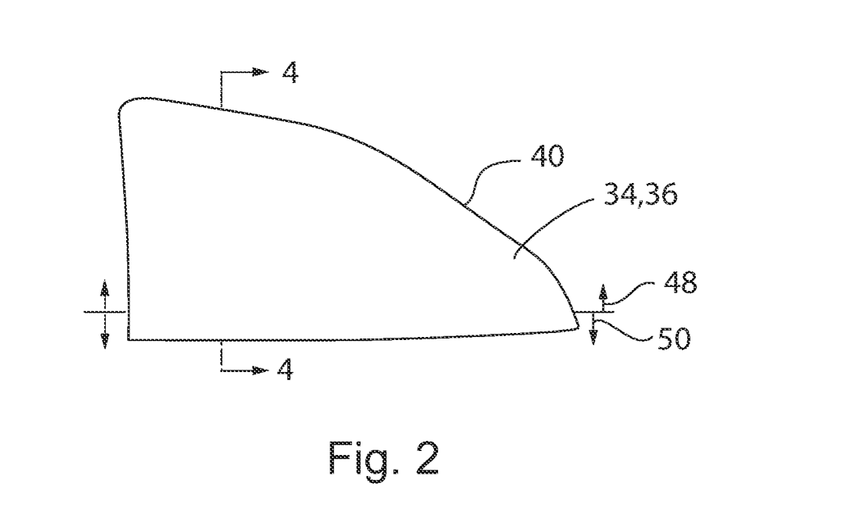
FIG. 2 is an elevational view of a side window assembly removed from the vehicle shown in FIG. 1.

As shown in FIG. 2, door windows 34, 36 are defined by a perimeter 40 that generally correlates to the shape of an opening 44, 46 (FIG. 1) defined by the structure of the respective doors 26, 28 of vehicle 10. When in the closed orientation, an upward directed portion of discrete windows 34, 36, indicated by arrow 48, is generally shaped to removeably cooperate with a gasket or seal disposed around the respective openings, 44, 46 associated with the underlying vehicle 10 whereas a lower portion of the discrete windows 34, 36, indicated by arrows 50, is constructed to be secured to the mounting structures that are disposed within the discrete doors 26, 28 of vehicle 10 and operable to effectuate the raising and lowering of the discrete windows 34, 36 at the user's discretion.

Figure 3:
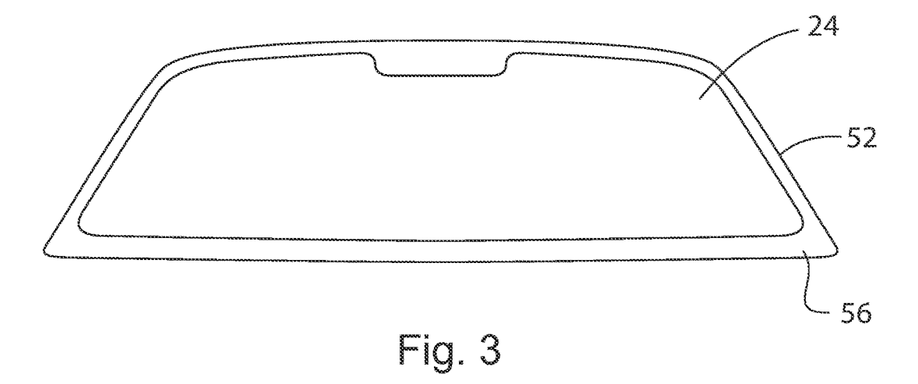
FIG. 3 is a plan view of a front window assembly removed from the vehicle shown in FIG. 1.

Referring to FIG. 3, windshield 30 of vehicle 10 is defined by a perimeter 52 that is shaped to cooperate with an opening 54 (FIG. 1) defined by vehicle 10. Windshield 30, and commonly each of the other stationary of non-operable windows of vehicle 10, include a fit 56 that is generally not transparent and which is disposed about the perimeter 52 of the respective window, such as windshield 30. Frit 56 commonly extends along the cabin facing surface of the respective window from the outermost radial edge or perimeter 52 thereof and slightly radially inboard relative thereto so as to not unduly interfere with the transparent operation of the respective window. Frit 56 is constructed to accommodate securing of windshield 24, and/or other stationary or non-operable windows, to vehicle 10 such that windows secured to vehicle 10 in such a manner are generally not movable or operable relative thereto but can be selectively removed from the vehicle should the same need to be replaced due to damage, leakage, or the like.

Figure 4:
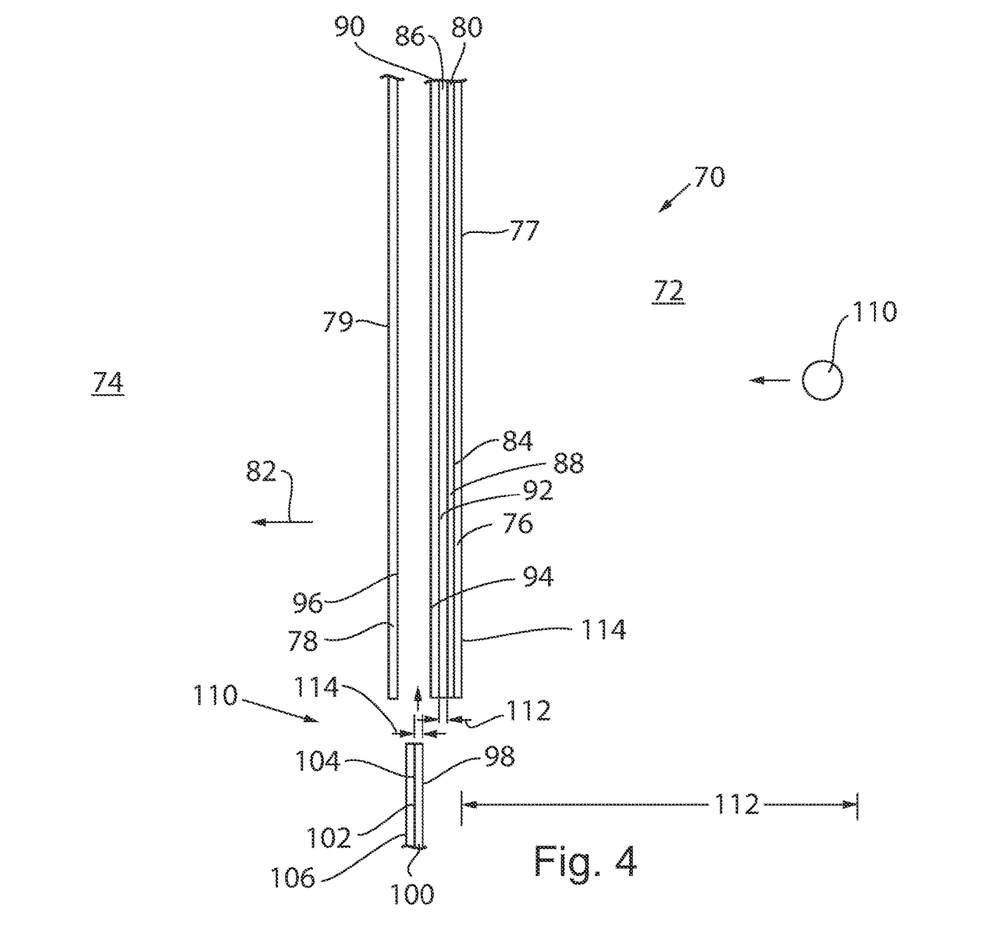
FIG. 4 is a cross section view of the window assembly taken along line 4-4 shown in FIG. 2.

FIG. 4 is a cross section view of one or more of the window assemblies or windows 30, 32, 34, 36, 38 of vehicle 10 show the laminate construction of the discrete window assemblies. Window assemblies 30, 32, 34, 36, 38 constructed in accordance with the forthcoming laminate window construction are better suited to withstand impacts so as to maintain the separation between the surrounding atmosphere and the volume or cavity defined by cabin 24. That is, even through the windows may fracture when subjected to severe or repeated impacts, the window assemblies retain sufficient structure integrity so as to maintain the security and isolation of cabin 24 from the surrounding atmosphere.

As shown in FIG. 4, each window of an environment intended to be secured, such as cabin 24 of vehicle 10, is defined by a window assembly 70 having a laminate construction. Each window assembly 70 is constructed to isolate an exterior environment 72 from an interior environment 74 that are separated by discrete window assemblies 70. Window assembly 70 includes a first pane of glass 76 that is directed toward the atmosphere side 72 thereof and the second pane of glass 78 that is directed toward the interior facing environment 74. Each pane of glass 76, 78 are formed either of a tempered, an annealed, or a heat strengthened glass material such that the opposing lateral sides 77, 79 of window assembly 70 are defined by respective glass layers 76, 78. Preferably, pane of glass 78 is no thicker than pane of glass 76 so as to provide thermal balancing of the respective panes of glass 76, 78 across window assembly 70. Preferably, cabin facing pane of glass 78 is slightly thinner than atmosphere facing pane of glass 76. Preferably, exterior facing pane of glass 76 is provided in the range of about 1.6 millimeters thick to about 6 millimeters thick and interior facing pane of glass 78 is provided in the range of about 1.6 millimeters thick to about 6 millimeters thick. Thicknesses of the discrete panes of glass 76, 78 in a range of 10% from the dimensions provided above is considered to be "about" the recited preferred dimensions.

An adhesive layer 80 is adhered to a laterally inboard facing side 84 of glass layer 76 such that adhesive layer 80 overlies laterally inboard facing side 84 of glass layer 76. Adhesive layer 80 is formed of one of an ethylene vinyl acetate (EVA) adhesive or a polyvinyl butyral (PVB) adhesive. A reinforcement layer 86 is secured to a laterally inboard facing side 88 of adhesive layer 80 such that reinforcement layer 86 overlies the laterally inboard facing side 88 of adhesive layer 80. Reinforcement layer 86 is formed of one of a polyethylene terephthalate (PET) material layer or thermoplastic polyester polyethylene terephthalate glycol (PET-G) material layer. Reinforcement layer 86 has a lateral thickness that is preferably uniform throughout the lateral footprint of the reinforcement layer and can be provided in thicknesses of about 3 millimeters to about 45 millimeters depending upon the degree of penetration resistance that the discrete window assembly 70 is intended to withstand without structural failure of the window assembly. Dimensions in a range of 10% from the respective dimensions above are considered to be "about" the recited preferred dimension. Another adhesive layer 90 is adhered to a laterally inboard facing side 92 of reinforcement layer 86 such that adhesive layer 90 overlies the laterally inboard facing side 92 of reinforcement layer 86. Like adhesive layer 80, adhesive layer 90 is also formed of one of an ethylene vinyl acetate (EVA) adhesive or a polyvinyl butyral (PVB) adhesive.

As disclosed further below with respect to FIG. 5, if window assembly 70 can provide a desired failure resistance or ability to withstand a requested lateral impact loading without structural failure of the resultant window assembly, an assembly facing side 96 of interior pane of glass 78 can be adhered to a cabin or enclosure facing side 94 of adhesive layer 90 thereby providing a window assembly 70 with a desired level of impact failure resistance and having interior and exterior facing glass panes 76, 78. Providing the exterior surfaces of window assembly 70 of glass materials allows users and consumers to interact with window assemblies 70 in customary manners, such as for cleaning and/or tinting operations, frit applications, and window assembly replacement operations, etc., without detrimentally affecting the operability of the window assembly when associated with an underlying vehicle.

If greater impact failure resistance is desired or requested than that which is provided by window assemblies having a single reinforcement layer 86 within the workable range of lateral thicknesses of reinforcement layer 86 as disclosed above, window assembly 70 can be provided with an additional number of desired reinforcement layers without detrimentally impacting the transparent construction of the resultant window assembly. That is, still referring to FIG. 4, if greater impact structural failure resistance is desired, and exterior facing side 98 of an additional reinforcement layer 100 can be adhered to cabin facing side 94 of adhesive layer 90. Reinforcement layer 100 is formed of one of a polyethylene terephthalate (PET) material layer or thermoplastic polyester polyethylene terephthalate glycol (PET-G) material layer and is preferably the same material as the other reinforcement layers of a respective window assembly 70. An additional adhesive layer 102 is adhered to a cabin facing side 104 of additional reinforcement layer 100 and defines a cabin facing surface 106 that is shaped the overlie glass pane 78. Adhesive layer 100 is formed of one of an ethylene vinyl acetate (EVA) adhesive or a polyvinyl butyral (PVB) adhesive and is preferably the same material as the other adhesive layers of a discrete window assembly 70.

It should be appreciated that additional respective reinforcement and adhesive layer pairs 110, and alternate thicknesses 112, 114, of the discrete reinforcement layers 86, 100, or number of discrete reinforcement layers 86, 100, and the thicknesses of glass layers 76, 78 can be provided to attain a desired structural failure resistance of respective window assemblies 70. Preferably, although the number and thickness of reinforcement layers, adhesive layers, and glass layers of a discrete window assembly may affect the overall thickness of a window assembly, the number and thickness of respective reinforcement layers 86, 100 and adhesive layers 80, 90, 102 are selected to maintain the operable and/or interoperable cooperation of the respective window assembly 70 without modification to the construction of the underlying OEM vehicle assembly as disclosed above.

Still referring to FIG. 4, governmental standards associated with the impact failure resistance of vehicle window assemblies are generally determined and verified by a drop ball test. Drop ball testing involves impacting a window assembly with a steel ball 110 accelerated under gravity a specified distance, indicated by arrow 112 from an exterior facing surface 114 of the tested window assembly. During testing, window assemblies 70 constructed in accordance with the disclosure of the present invention were capable of withstanding drop ball testing wherein a ball 110 having a mass of 0.5 lbs. was impacted upon the window assembly from distances of 10 feet to 30 feet with no or negligible damage to the underlying window assembly. No damage was characterized as no fracturing of either of the glass panes 76, 78 whereas negligible damage was characterized by limited fracturing of the discrete glass pane 76, 78 but to a good degree insufficient to appreciably detract from visibility through the respective window assembly. Although greater impact energies have a tendency to impart greater degrees of fracture of the discrete glass panes, the structural integrity or the ability window assemblies 70 to maintain cross-sectional footprint of the discrete window assembly even when impacted showed marked improvement over known vehicle window assembly constructions were in the discrete window assemblies are configured to cooperate with the underlying vehicle without supplemental mounting and/or securing arrangements. Further, although the discrete glass panes 76, 78 of the discrete windows may fracture, cooperation with the adjacent adhesive layers prevented any appreciable separation of portions of the fractured glass panes from the discrete window assembly 70 such that window assembly 70 provided greater security performance of the interior spaces such as cabin 24 of vehicle 10. Preferably, window assemblies 70 constructed in accordance with the disclosure of the present invention have a lateral thickness of between about 3 millimeters and 10 millimeters although window assemblies 70 may be provided in other thicknesses as a function of the impact loading intended to be withstood. The relative thickness dimensions provided above may be 10% greater or less than the preferred dimensions provided above.

Figure 5:
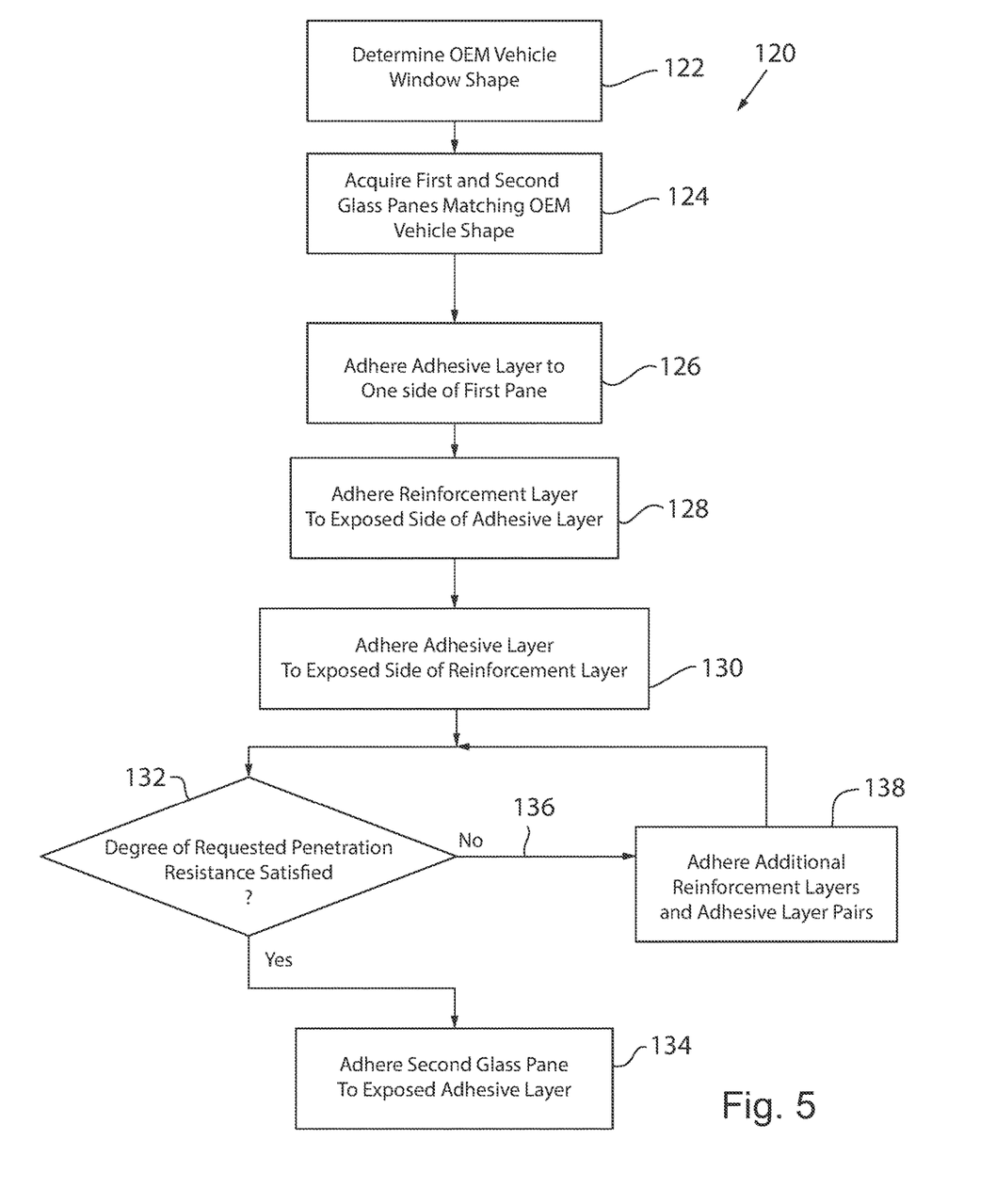
FIG. 5 is flow chart showing a method of forming the window assemblies shown in FIGS. 1-4.

FIG. 5 shows a method 120 of equipping of vehicle with one or more improved security or impact resistant window assemblies such as window assembly 70. The method includes determining an original equipment manufacturer vehicle window shape and acquiring first and second glass panes that match the shape of the OEM vehicle windows 124. It should be appreciated that the OEM vehicle windows as well as glass panes 76, 78 may have a generally flat or curvilinear shape that will vary depending upon the placement and/or OEM vehicle type. It is further appreciated that the discrete glass panes acquired at step 124 may have a designation as being the cabin facing and/or atmosphere facing discrete glass panes associated with the resultant window assembly. Adhesive layer is adhered to one side of a first pane of glass 126 and direct reinforcement layer is exposed to the opposing side of the respective adhesive layer applied in step 126, 128. A subsequent adhesive layer is adhered to the exposed side of the previous placed reinforcement layer 130. If a single reinforcement layer 130 provides a desired degree of penetration resistance 132 the second pane of glass is adhered to the exposed surface of the respective adhesive layer applied in step 130 thereby completing the discrete window assembly 134 if a single reinforcement layer provides a less than desired penetration resistance 136, an additional reinforcement layer and additional adhesive layer 138 are sequentially adhered to the exposed surface of the adhesive layer applied at step 130. It should be appreciated that steps 132 and 138 can be repeated until a desired degree of penetration resistance is satisfied such that the second pane of glass can be adhered to the exposed surface of the respective immediately preceding adhesive layer 134. It is further appreciated that the respective adhesive layers and reinforcement layers of a respective window assembly may require trimming the perimeter defined by the first and second panes of glass acquired at step 124. Once fully assembled, the resultant window assembly can be associated with the underlying vehicle in a manner customary for window replacement and cooperation but the underlying OEM vehicle 10 in the same manner as the installation of the OEM windows.

Although the foregoing description is directed to improving the security resistance and structural integrity of vehicle window assemblies, it is appreciated that window assembly 70 may be provided in a substantially planar form factor rendering the same suitable for application and installation and building structures. Further disclosure associated with the incorporation of window assemblies 70 constructed in accordance with the present invention when used to improve of the security envelope defined by building envelopes is further provided in applicants issued U.S. Pat. No. 11,029, 132. When employed for building envelope security improvement, one or more window assemblies 70 provided in a generally planar form factor can be secured to the building structure in a spaced relation relative to conventional building window structures.

Therefore, one embodiment of the invention includes an impact resistant window assembly that includes a first glass layer and a second glass layer that define opposing lateral sides of the impact resistance window assembly. A first adhesive layer and a second adhesive layer that are each comprised of one of an ethylene vinyl acetate (EVA) adhesive or a polyvinyl butyral (PVB) adhesive and such that the first adhesive layer overlies at least one side of the first glass layer and the second adhesive layer overlies at least one side of second glass layer. A reinforcement layer comprising one of a polyethylene terephthalate (PET) layer or thermoplastic polyester polyethylene terephthalate glycol (PET-G) layer that overlies and is disposed between the first adhesive layer and the second adhesive layer. When assembled, the impact resistant window assembly is shaped and constructed to cooperate with the operational and mounting arrangements defined by original equipment manufacturers building and vehicle openings and preferably remain intact when subjected to at least a 5 pound ball drop test from 30 feet and has a thickness that allows the impact resistant window assembly to be secured to an opening defined by the original equipment manufacturer (OEM) mounting arrangement.

Another embodiment of the invention having or combinable with one or more features, objects, or aspects of the previous embodiment includes a window assembly having a first glass layer that is disposed on a first side of the window assembly and a second glass layer that is disposed on a second side of the window assembly. A first adhesive layer and a second adhesive layer that are each comprised of one of an ethylene vinyl acetate (EVA) adhesive or a polyvinyl butyral (PVB) adhesive each overlie an assembly inward facing respective side of the first glass layer and the second glass layer. A reinforcement layer that is comprised of one of a polyethylene terephthalate (PET) material or thermoplastic polyester polyethylene terephthalate glycol (PET-G) material overlies and is disposed between the first adhesive layer and the second adhesive layer such that the first and second glass layers are disposed on laterally outward facing sides of the window assembly and the adhesive layers and the reinforcement layer are disposed between the respective first and second glass layers.

A further embodiment of the invention that is combinable or useable with one or more of the features, aspects, or advantages of the prior embodiments includes a method of forming a window assembly that includes acquiring a first pane of glass and a second pane of glass that are the same shape and each one of a tempered, an annealed, or a heat strengthened pane of glass. A first adhesive layer formed of one of an ethylene vinyl acetate (EVA) adhesive or a polyvinyl butyral (PVB) adhesive is adhered to a respective side of the first pane of glass. A reinforcement layer formed of one of a polyethylene terephthalate (PET) layer or thermoplastic polyester polyethylene terephthalate glycol (PET-G) layer is adhered to the first adhesive layer so that the reinforcement layer overlies the first adhesive layer. A second adhesive layer that is formed of one of the ethylene vinyl acetate (EVA) adhesive or the polyvinyl butyral (PVB) adhesive is adhered to an exposed surface of the reinforcement layer so that the second adhesive layer overlies the reinforcement layer and an exposed surface of the second adhesive layer can be adhered to the second pane of glass.

It should be understood that the above description, while indicating representative embodiments of the present invention, is given by way of illustration and not of limitation. Many changes and modifications may be made within the scope of the present invention without departing from the spirit thereof, and the invention includes all such modifications. Various additions, modifications, and rearrangements are contemplated as being within the scope of the following claims, which particularly point out and distinctly claim the subject matter regarding as the invention, and it is intended that the following claims cover all such additions, modifications, and rearrangements.

What is claimed is:

1. A window assembly comprising:
   a first glass layer and a second glass layer that define opposing lateral sides of a window assembly and which each have a corresponding curved shape;
   a first adhesive layer and a second adhesive layer that are each comprised of one of an ethylene vinyl acetate (EVA) adhesive or a polyvinyl butyral (PVB) adhesive and such that the first adhesive layer overlies and extends radially beyond at least one side of the first glass layer and the second adhesive layer overlies at least one side of second glass layer;
   a reinforcement layer comprising one of a polyethylene terephthalate (PET) or thermoplastic polyester polyethylene terephthalate glycol (PET-G) layer that overlies and is disposed between the first adhesive layer and the second adhesive layer, the reinforcement layer having a lateral thickness between 3 mm and 45 mm and wherein the first adhesive layer, second adhesive layer, and reinforcement layer are trimmable to correspond to the curved shape of the first glass layer and the second glass layer; and
   wherein the window assembly remains intact when subjected to at least a 5 pound ball drop test from 30 feet and has a thickness that allows the window assembly to be secured to an opening defined by an original equipment manufacturer (OEM) mounting arrangement.

2. The window assembly of claim 1 wherein an inward facing one of the first glass layer and the second glass layer relative to a cavity defined by the OEM mounting arrangement is thinner than an outward facing one of the first glass layer and the second glass layer.

3. The window assembly of 1 further comprising another reinforcement layer and another adhesive layer disposed between the reinforcement layer an adjacent one of the first adhesive layer and the second adhesive layer.

4. The window assembly of claim 1 wherein at least one of the first glass layer and the second glass layer are thicker than at least one of the first glass layer and the second glass layer.

5. The window assembly of claim 1 wherein at least one of the first glass layer and the second glass layer are formed of at least one of a tempered, an annealed, or a heat strengthened glass material.

6. The window assembly of claim 5 wherein each of the first glass layer and the second glass layer are both formed of the one of the tempered, the annealed, or the heat strengthened glass material.

7. The window assembly of claim 1 further comprising a frit adhered about a circumference of an enclosure facing exterior surface of a respective one of the first glass layer and the second glass layer.

8. The window assembly of claim 1 wherein the window assembly defines at least one of a side window, a windshield, and a rear window of an OEM vehicle.

9. A window assembly comprising:
   a first glass layer disposed on a first side of the window assembly;
   a second glass layer disposed on a second side of the window assembly, each of the first glass layer and the second glass layer having a curved shaped;
   a first adhesive layer and a second adhesive layer that are each comprised of one of an ethylene vinyl acetate (EVA) adhesive or a polyvinyl butyral (PVB) adhesive and such that the first adhesive layer overlies and extends radially beyond an inward facing side of the first glass layer and the second adhesive layer overlies and extends radially beyond an inward facing side of the second glass layer; and
   a reinforcement layer comprising one of a polyethylene terephthalate (PET) or thermoplastic polyester polyethylene terephthalate glycol (PET-G) layer having a thickness between 3 mm and 45 mm that overlies and is disposed between the first adhesive layer and the second adhesive layer and such that the first adhesive layer, the second adhesive layer, and the reinforcement layer are trimmable after securing between the first glass layer and the second glass layer to correspond to a shape of the first glass layer and the second glass layer such that the window assembly remains intact when the window assembly is subjected to at least a 5 pound ball drop test from 30 feet.

10. The window assembly of claim 9 further comprising another reinforcement layer comprising one of a polyethylene terephthalate (PET) or thermoplastic polyester polyethylene terephthalate glycol (PET-G) layer and a third adhesive layer that is disposed between the reinforcement layer and the another reinforcement layer.

11. The window assembly of claim 9 wherein an inward facing one of the first glass layer and the second glass layer is thinner than an outward facing one of the first glass layer and the second glass layer.

12. The window assembly of claim 9 wherein the window assembly has a shape to cooperate with an opening defined by an OEM vehicle.

13. The window assembly of claim 12 wherein the window assembly defines an operable window of the OEM vehicle.

14. The window assembly of claim 9 wherein at least one of the first glass layer and the second glass layer is one of a tempered, an annealed, or a heat strengthened glass layer.

15. The window assembly of claim 14 wherein each of the first glass layer and the second glass layer are a common one of the tempered, the annealed, or the heat strengthened glass layer.

16. A method of forming a window assembly; the method comprising:
    acquiring a first pane of glass that is one of a tempered, annealed, or heat strengthened pane of glass;
    acquiring a second pane of glass having the same shape as the first pane of glass and that is one of a tempered, annealed, or heat strengthened pane of glass, each of the first pane of glass and the second pane of glass having a curved shape;
    adhering a first adhesive layer formed of one of an ethylene vinyl acetate (EVA) adhesive or a polyvinyl butyral (PVB) adhesive to a respective side of the first pane of glass such that the first adhesive layer extends radially beyond the first pane of glass;
    adhering a reinforcement layer formed of one of a polyethylene terephthalate (PET) layer or thermoplastic polyester polyethylene terephthalate glycol (PET-G) layer having a thickness between 3 mm and 45 mm to the first adhesive layer so that the reinforcement layer overlies the first adhesive layer; and
    adhering a second adhesive layer formed of one of the ethylene vinyl acetate (EVA) adhesive or the polyvinyl butyral (PVB) adhesive to an exposed surface of the reinforcement layer so that the second adhesive layer overlies the reinforcement layer and an exposed surface of the second adhesive layer can receive the second pane of glass and trimming the first adhesive layer, the reinforcement layer, and the second adhesive layer to correspond to a shape of the first pane of glass and the second pane of glass and such that, when assembled, the window assembly remains intact when subjected to at least a 5 pound ball drop test from 30 feet.

17. The method of claim 16 further comprising adhering another reinforcement layer having a thickness between 3 mm and 45 mm to the exposed surface of the second adhesive layer and a third adhesive layer to an exposed surface of the another reinforcement layer for receiving the second pane of glass and concurrently trimming each of the first adhesive layer, the reinforcement layer, the second adhesive layer, the another reinforcement layer, and the third adhesive layer to correspond to the shape of the first pane of glass and the second pane of glass.

18. The method of claim 17 further comprising selecting a thickness of the reinforcement layer and the another reinforcement layer based on an intended impact load the window assembly is intended to withstand.

19. The method of claim 16 further comprising selecting the second pane of glass to be thinner than the first pane of glass.

20. The method of claim 16 further comprising shaping the first pane of glass and the second pane of glass to define at least one of an OEM vehicle windshield, an OEM vehicle rear window, and an OEM vehicle side window such that the window assembly cooperates with an OEM vehicle in the same manner as a comparable OEM window.

\* \* \* \* \*